(No Model.)

H. HOLCOMB.
DEVICE FOR CUTTING GROOVES IN AXLE COLLARS.

No. 468,085.　　　　　　　　Patented Feb. 2, 1892.

Witnesses　　　　　　　　　　　　　　　Inventor
Arthur Ashley　　　　　　　　　　　　　Horace Holcomb
J. H. Siggers.　　By his Attorneys,
　　　　　　　　　　C. A. Snow & Co.

UNITED STATES PATENT OFFICE.

HORACE HOLCOMB, OF WILKES-BARRÉ, PENNSYLVANIA.

DEVICE FOR CUTTING GROOVES IN AXLE-COLLARS.

SPECIFICATION forming part of Letters Patent No. 468,085, dated February 2, 1892.

Application filed June 9, 1891. Serial No. 395,686. (No model.)

*To all whom it may concern:*

Be it known that I, HORACE HOLCOMB, a citizen of the United States, residing at Wilkes-Barré, in the county of Luzerne and State of Pennsylvania, have invented a new and useful Device for Cutting Grooves in Axle-Collars, of which the following is a specification.

This invention relates to devices for cutting grooves in the collars of vehicle-axles; and it has for its object to provide a tool or device by means of which annular undercut grooves may be formed in the collars of vehicle-axles more rapidly, accurately, and economically than heretofore.

With these ends in view the invention consists in the construction of the tool or cutting device and the method of mounting and using the same, which will be hereinafter more fully described, and particularly pointed out in the claims.

Figure 1:
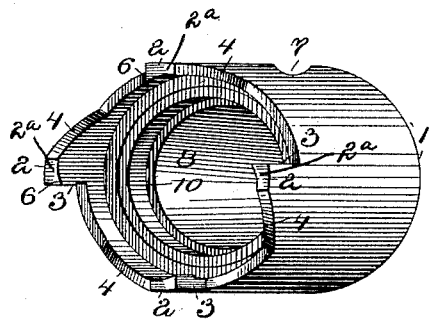
Figure 2:
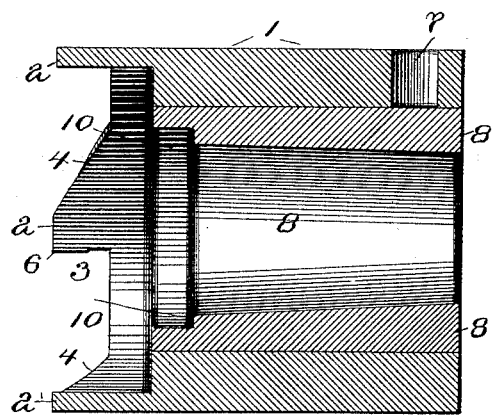
Figures 3, 4:
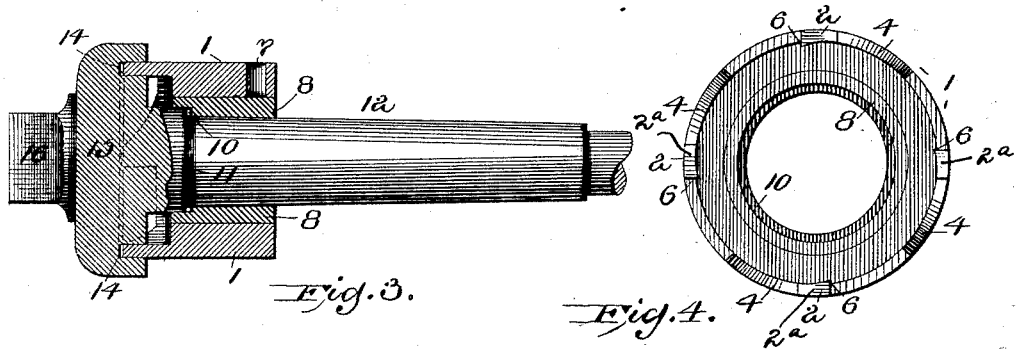

In the accompanying drawings, Figure 1 is a perspective view of my improved cutting-tool. Fig. 2 is a longitudinal sectional view of the tool and core or inner sleeve. Fig. 3 is a longitudinal sectional view showing the cutting-tool and the inner sleeve in position for operation upon a vehicle-axle. Fig. 4 is a front view of the cutting-tool.

Like numerals of reference indicate like parts in all the figures.

My improved cutting-tool is composed of a tubular cylinder 1, made of steel and provided at its front end with a series of teeth or cutters 2 2, which are concentric with the axis of the cylinder 1. The said teeth 2 2 are shaped like saw-teeth and are provided with front sides or walls 3, which are straight and at right angles to the axis of the cylinder, the straight top edges 2ª at right angles to said front edges and all in the same plane with each other to smooth the cut groove, and with beveled or inclined rear walls 4 slanting inwardly from said top edges. The points of the teeth or cutters 2 are to be given sufficient clearance to avoid friction, and the said points are sharpened to form cutting-edges 6.

The body of the tubular cylinder is of greater thickness than the teeth or cutters, in order to insure the necessary strength, and the said body is provided with a perforation 7, adapted to receive a tool or holder, the opposite end of which is to be mounted in the tool post or carriage of an ordinary turning lathe or machine in which it is to be mounted for use.

8 designates a sleeve, which has its bearing in the tubular cylinder 1, in which it is mounted in such a manner as to fit closely and at the same time to enable it to rotate freely. The sleeve 8 may have either a straight or a tapering bore, according to the shape of the spindle of the axle upon which it is to be mounted. In the drawings hereto annexed the said sleeve has been shown as provided with a tapering bore provided at one end with an annular recess or groove 10, adapted to fit upon the spindle 11 of the axle upon which it is mounted for operation.

In operation the sleeve 8 is fitted upon the spindle 11 of the axle 12, which latter is mounted in an ordinary turning-lathe, in which it may be rotated while the cutting-tool is being fed toward it. The sleeve 8, which is fitted tightly upon the spindle, acts as a guide by means of which the cutting-tool is kept securely in concentric position with relation to the axle while the latter is being operated upon, thus causing the undercut groove, as shown at 14, to be formed rapidly and accurately in the collar 15 of the axle 16.

Heretofore the undercut grooves formed in axle-collars for the reception of the ends of the axle-boxes have been formed by means of a hooked tool in a lathe tool-post, the grooves being dug out by repeated cuttings and tests. My improved tool cuts out the recess cleanly, smoothly, and exactly of the right size and in much less time than it could possibly be formed in the manner which is now usually practiced.

Most axle arms or spindles being tapered it is necessary to provide the sleeve with a tapering bore to correspond with the shape of the spindle and a straight outside face on which the cylinder is mounted, whereby the cutters are caused to enter the collar exactly concentric with the axle-spindle.

Having thus described my invention, I claim and desire to secure by Letters Patent of the United States—

1. A tool for forming annular undercut grooves in axle-collars, the same consisting of a tubular cylinder provided at its front end with teeth or cutters having straight front sides, flat straight top edges at right angles to said front sides, and beveled rear walls slanting inwardly from said top edges, substantially as and for the purpose set forth.

2. In a device for forming annular undercut grooves in axle-collars, the combination of the tubular cylindrical cutting-tool having teeth or cutters and the guide-sleeve fitted in said tubular cutter and having its bore fitted to the spindle of the axle which is to be operated upon, substantially as and for the purpose set forth.

3. In a device for forming annular undercut grooves in axle-collars, the combination of a tubular cylindrical cutting-tool provided at its front edge with teeth or cutters concentric with the axis of the cylinder, said cutting-tool being provided with a perforation to receive a holding pin or key, and an annular guide-sleeve fitted in said cutting-tool, substantially as and for the purpose set forth.

In testimony that I claim the foregoing as my own I have hereto affixed my signature in presence of two witnesses.

HORACE HOLCOMB.

Witnesses:
T. LYNCH,
J. G. PIERSON.